United States Patent [19]

Miura

[11] 4,142,409
[45] Mar. 6, 1979

[54] DEVICE FOR DETECTING A RUNNING YARN TENSION

[75] Inventor: Kazuchika Miura, Mihara, Japan

[73] Assignee: Teijin Limited, Osaka, Japan

[21] Appl. No.: 881,121

[22] Filed: Feb. 24, 1978

[30] Foreign Application Priority Data

Apr. 5, 1977 [JP] Japan .................................. 52/38135

[51] Int. Cl.² .............................................. G01L 5/04
[52] U.S. Cl. .......................................... 73/144; 336/30
[58] Field of Search ................ 73/95.5, 143, 144, 160; 336/30

[56] References Cited

U.S. PATENT DOCUMENTS

| | | | |
|---|---|---|---|
| 2,695,519 | 11/1954 | Lodge | 73/144 |
| 4,058,008 | 11/1977 | Pilkington | 73/144 |

*Primary Examiner*—James J. Gill
*Attorney, Agent, or Firm*—Burgess, Ryan and Wayne

[57] ABSTRACT

Disclosed is a device for detecting tension in a running yarn which comprises a U-shaped primary core which has primary windings wound thereon and which is capable of being electromagnetically excited by means of an alternating current; a U-shaped secondary core which faces the primary core with a small air gap therebetween and forms a main magnetic circuit therewith, and which has secondary windings wound thereon for interlinking the secondary core with the main magnetic circuit; a rotatable member consisting of a shaft which is rotatably supported on an axis and a circular disc of a non-magnetic material secured to the shaft, and then swung between the air gaps; and a magnetic flux by-passing member fastened to the circular disc and consisting of a thin plate of a ferromagnetic substance which has a crescent shape formed from a circular disc having a large diameter and a removed circular opening having a small diameter, which opening is removed from the disc. The device has a very wide linear range and is preferable for detecting a running yarn tension.

10 Claims, 6 Drawing Figures

DEVICE FOR DETECTING A RUNNING YARN TENSION

BRIEF DESCRIPTION OF THE INVENTION

This invention relates to a device for detecting a running yarn tension, for example, the tension of a yarn occurring just before the yarn is wound around a bobbin.

Many methods are known for measuring the tension of a running yarn. However, these methods involve many problems. For example, the Differential Transformer Method which is often used for detecting a yarn tension has the problems in that the detecting device according to this method does not have sufficient mechanical strength and that the device does not respond accurately to a yarn tension variation. On the other hand, the Rotating Transformer Method which is also often used for detecting a yarn tension has the problem in that the device according to the method requires a high operating torque; therefore, such device cannot be utilized for detecting a low tension without causing damages to the yarn.

To overcome the above-mentioned problems, the inventor of the present invention provided a yarn tension detector which comprises: a U-shaped primary core which has primary windings wound thereon for electromagnetically exciting the primary core by means of an alternating current; a U-shaped secondary core which is located to face to the primary core for forming small air gaps therebetween and to form a main magnetic circuit between the two cores, and which has secondary windings wound thereon for detecting magnetic flux passing through the main magnetic circuit; a rotatable shaft having a rotating axis perpendicular to a plane on which the air gaps are located and being rotatable in accordance with changes in the tension of a running yarn to be detected; and a fan-shaped plate secured to the rotatable shaft and located on the plane so as to rotate within and outside of the small air gaps, for by-passing magnetic flux from the main magnetic circuit so as to form an auxiliary magnetic circuit. (Japanese Laid-open Patent Application No. 50-56983) The yarn tension detector has sufficient mechanical strength for responding to a yarn tension variation with sufficient accuracy and for detecting a low yarn tension. In addition, since the yarn tension detector can be actuated by a commercial alternating current, the detector does not need a special designed oscillator for supplying a high frequency power. Since the output voltage of the yarn tension detector is sufficiently high, the output can accordingly be read without being passed through an amplifier for transmission thereof. However, since the yarn tension detector is provided with a fan-shaped magnetic flux by-passing plate, the yarn tension detector has a very narrow linear range in which the output signal thereof is proportional to the input yarn tension. As a result, the yarn tension detector has limited applications and cannot be utilized if it is required to have a wide linear range.

SUMMARY OF THE INVENTION

The principal object of the present invention is to provide a device for detecting a running yarn tension which has a specially designed magnetic flux by-passing member for by-passing the magnetic flux from a main magnetic circuit which is formed between two U-shaped cores in accordance with changes in the tension of a yarn to be detected. The yarn tension detector according to the present invention has a very wide linear range.

The above-mentioned object is achieved by forming the magnetic flux by-passing member in a form in which the width of the member, measured in a direction perpendicular to the moving direction of the member on a plane upon which the member is moved, is varied in accordance with the movement of the member due to the changes in the tension of the running yarn.

In the illustrated embodiment according to the present invention, the magnetic flux by-passing member is constructed to be rotatable within and outside of air gaps formed between the cores in accordance with changes in the tension of the yarn to be detected. The magnetic flux by-passing member is preferably formed in a crescent shape formed from a circular disc having a large diameter and a removed circular opening having a small diameter, which opening is removed from the disc. The peripheries of the disc and the opening are in point contact with each other. In some cases, only one-half of the crescent-shaped magnetic flux by-passing member, which is divided by a line connecting the centers of the disc and the opening, can be used as a magnetic flux by-passing member.

In an embodiment of the present invention which is not illustrated, the magnetic flux by-passing member is constructed to be rectilinearly movable within and outside of air gaps formed between the cores in accordance with changes in the tension of the yarn to be detected, and the magnetic flux by-passing member is preferably formed in a triangular shape.

Other features and advantages of the present invention will become apparent from the following detailed description of the invention with reference to the accompanying drawings.

DETAILED DESCRIPTION OF THE INVENTION

A device for detecting a running yarn tension according to the present invention is explained hereinafter with reference to the accompanying FIG. 1. A housing 1 and a cover 2 are fastened together by screw bolts 3 to form a box. A primary core 5, which is formed in a U-shape and which has primary windings 7 wound thereon, is fastened to the housing 1 via a bracket 4. A secondary core 6, which is also formed in a U-shape, is fastened to the housing via the bracket 4 so that end surfaces 5a and 5a' of the primary core 5 face respectively to end surfaces 6a and 6a' of the secondary core 6, thereby forming small air gaps G between the end surfaces 5a, 5a' and 6a, 6a'. Secondary windings 8 are wound around the secondary core 6. One end of the primary windings 7 is wired with a connector 9a, and the other end is wired with a connector 9b. The connectors 9a and 9b are disposed on the housing 1 and utilized for supplying a commercial alternating current from an external alternating power source 10. When the alternating current is supplied to the primary windings 7, the primary core 5 is electromagnetically excited by the primary windings 7, and a main magnetic circuit $C_m$ (see FIG. 3) is formed between the primary core 5 and the secondary core 6. Thereafter, a voltage is induced in the secondary windings 8 by the main magnetic circuit $C_m$ and transmitted to an indicating device 14 through connectors 11a and 11b, which connectors are wired with one end of the secondary windings, respectively. The indicating device 14 comprises a rectifier 12 which rectifies the induced alternating current voltage into a direct current voltage and a voltmeter 13 for indicating the rectified voltage. In another embodiment, the indicating device 14 can be replaced by a voltmeter for an alternating current voltage.

A rotatable member 19 comprises a rotatable shaft 15 which is rotatably supported via bearings 16 and 17 mounted on the housing 1, and a circular disc 18 of a non-magnetic material with a low permeability, such as a copper or a plastic material, which has a diameter D(FIG. 2) and which is fixed to the rotatable shaft 15 with one or more screws 20. The rotatable shaft 15 consists of two parallel bars 15a and 15c and a lever 15b which connects the bar 15a to the bar 15c. The bar 15c has a yarn guide 26 rotatably mounted thereon and is urged by a tension spring 21 which is connected to a hooked bar 22 and which is utilized for adjusting the detected yarn tension level. The hooked bar 22 is threaded to a bracket 24 and locked by nuts 23, which bracket is fixed to the housing 1 by screw bolts 25. The yarn guide 26 has a groove 26a formed thereon for engaging a running yarn Y. As a result, the rotatable shaft 15 is rotated in accordance with changes in the tension of the yarn Y which is engaged with the yarn guide 26, and the disc 18 is rotated within the air gaps G formed between the primary core 5 and the secondary core 6.

A magnetic flux by-passing member 27 is connected to the disc 18 by means of gluing, welding or utilizing screw bolts. The member 27 comprises a thin plate of a magnetic material with a high permeability, preferably of a ferromagnetic substance such as silicon steel. The thin plate 27 has a crescent shape (see FIG. 2) formed from a circular disc 27a having a large diameter D and a removed circular opening 27b having a small diameter d, which opening is removed from the disc 27a. The center $O_2$ of the opening 27b is caused to be eccentric from the center $O_1$ of the disc 27a by a distance e which is equal to one half of the difference between the diameters D and d so that the peripheries of the disc 27a and the opening 27b are in point contact with each other. In some cases the distance e may be greater or less than one half of the difference between the diameters D and d.

Figure 3:
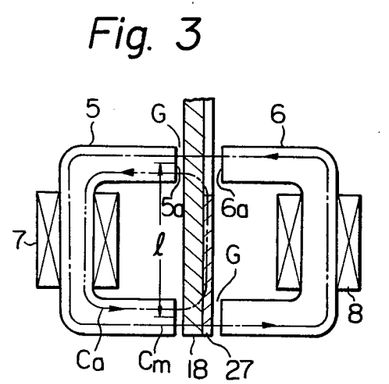
FIG. 3 is an enlarged partial front view which illustrates the cores and a magnetic flux by-passing member of the device illustrated in FIG. 1.

When the magnetic flux by-passing member 27 is located within the air gaps G as shown in FIG. 3, the magnetic flux generated in the primary core 5 by the primary windings 7 is by-passed through the magnetic flux by-passing member 27, and an auxiliary magnetic circuit $C_a$ is formed between the primary core 5 and the magnetic flux by-passing member 27.

Figure 4:
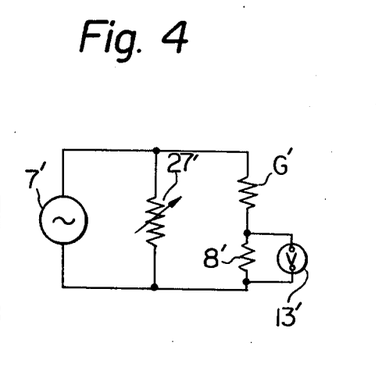
FIG. 4 is an equivalent electric circuit which is a simulation of the magnetic circuit formed by the cores and the magnetic flux by-passing member illustrated in FIG. 3.

The relationship between the primary core 5 and the magnetic flux by-passing member 27 is varied when the disc 18 and the magnetic flux by-passing member 27 are rotated in accordance with changes in the tension of the yarn Y as described later with reference to FIGS. 5(a) through 5(e). As a result, the magnetic reluctance in the auxiliary magnetic circuit $C_a$ is varied in accordance with changes in the tension of the yarn Y. The above-described phenomenon is explained with regard to the equivalent circuit shown in FIG. 4. In FIG. 4, an alternating power source 7', which is compared to the primary windings 7 (FIG. 3) and which supplies a constant alternating current, is connected to a resistor G' which is compared to the air gaps G (FIG. 3) and to a resistor 8' which is compared to the secondary windings 8 (FIG. 3). The power source 7' is also connected to a variable resistor 27' which is compared to the magnetic flux by-passing member 27 (FIG. 3). As mentioned above, since the alternating power source 7' supplies a constant alternating current, the current passing through the resistor 8' is varied when the resistance of the variable resistor 27' is varied. The voltage drop through the resistor 8', which is indicated by a voltmeter 13' and compared to the output indicated by the voltmeter 13 (FIG. 1), is varied when the resistance of the variable resistor 27' is varied. Similarly in FIG. 3, when the magnetic flux by-passing member 27 is rotated, the magnetic flux passing through the auxiliary circuit $C_a$ and the voltage induced in the secondary windings 8 are both varied.

The positional relationship between the primary core 5 and the magnetic flux by-passing member 27 is explained hereinafter with reference to the accompanying FIGS. 5(a) through 5(e). In the following explanation, the swinging angle $\theta$ is defined as an angle between the vertical line V which passes through the center $O_1$ of the disc 27a and the line "a" which passes through the centers $O_1$ and $O_2$ of the opening 27b. It should be noted that the rotating axis of the rotatable member 19, which comprises the rotatable shaft 15 and the disc 18 (FIG. 1), passes through the center $O_1$ of the disc 18, which is aligned with the center of the disc 27a, and is perpendicular to the disc 18.

Figure 5A:
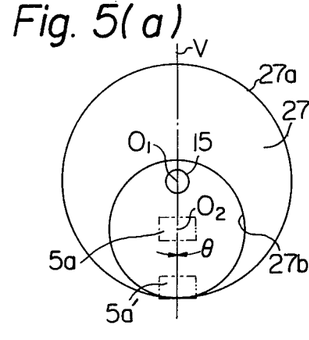
FIGS. 5(a) through 5(e) illustrate the relationship between the core and the magnetic flux by-passing member.

Referring to FIG. 5(a) in which the swinging angle $\theta$ is zero degree, the ends 5a and 5a' of the primary core 5 face nearly to the opening. Accordingly, the magnetic reluctance of the auxiliary magnetic circuit caused by the magnetic flux by-passing member 27 is very high and the magnetic flux generated by the primary windings 7(FIG. 3) cannot by-pass through the auxiliary magnetic circuit $C_a$ (FIG. 3).

Figure 5B:
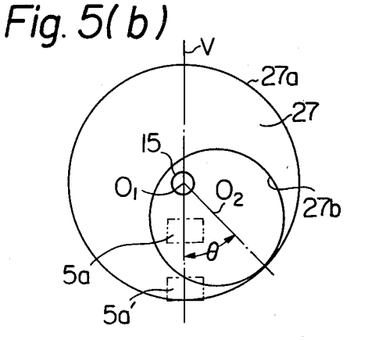

Referring to FIG. 5(b), since the magnetic flux by-passing member 27 is swung to a swinging angle of 45°, the lower end 5a' of the primary core 5 is caused to face to the crescent-shaped magnetic flux by-passing member 27 while the upper end 5a of the primary core 5 is caused to face to the opening 27b. Accordingly, the magnetic reluctance of the auxiliary magnetic circuit $C_a$ (FIG. 3) caused by the magnetic flux by-passing member 27 is decreased, and more magnetic flux can by-pass through the auxiliary magnetic circuit $C_a$ (FIG. 3). As a result, the magnetic flux passing through the main magnetic circuit $C_m$ (FIG. 3) is decreased, and the voltmeter 13 (FIG. 1) therefore indicates a decreased voltage.

Figure 5C:
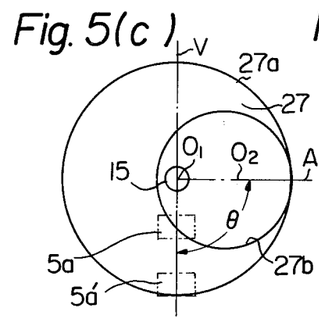
Figure 5D:
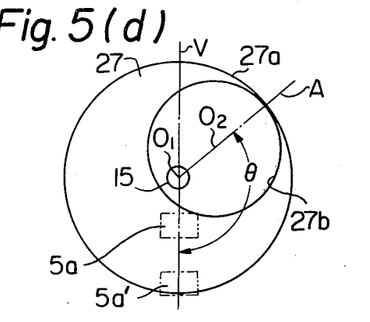

As the magnetic flux by-passing member 27 is rotated as shown in FIGS. 5(c) and 5(d), the area of the upper end 5a of the primary core 5 facing to the magnetic flux by-passing member 27 is gradually increased, while the lower end 5a' of the primary core 5 is caused to face to the magnetic flux by-passing member 27. Accordingly, the magnetic reluctance of the auxiliary magnetic circuit $C_a$ (FIG. 3) caused by the magnetic flux by-passing member 27 is gradually decreased, thereby more magnetic flux can by-pass through the auxiliary magnetic circuit $C_a$ (FIG. 3) in accordance with the rotation of the magnetic flux by-passing member 27. However, the degree of the decrease of the magnetic reluctance with respect to the increase of the swinging angle $\theta$ is gradually decreased when the swinging angle reaches 90°.

Figure 5E:
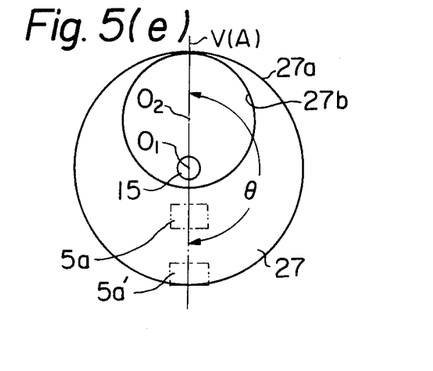

When the magnetic flux by-passing member 27 is rotated more than 135°, the upper end 5a of the primary core 5 and the lower end 5a' of the primary core 5 are caused to face to the magnetic flux by-passing member 27. Accordingly, the magnetic reluctance of the auxiliary magnetic circuit $C_a$ caused by the magnetic flux by-passing member 27 becomes almost constant when the magnetic flux by-passing member 27 is rotated more than 135°.

EXAMPLE

Figure 1:
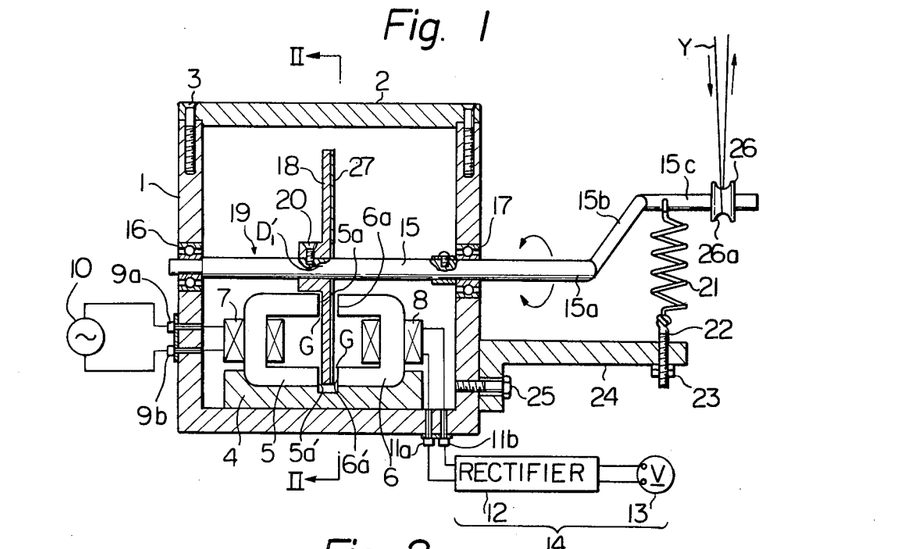
FIG. 1 is a cross-sectional front view which illustrates a device for detecting a running yarn tension according to the present invention.
Figure 2:
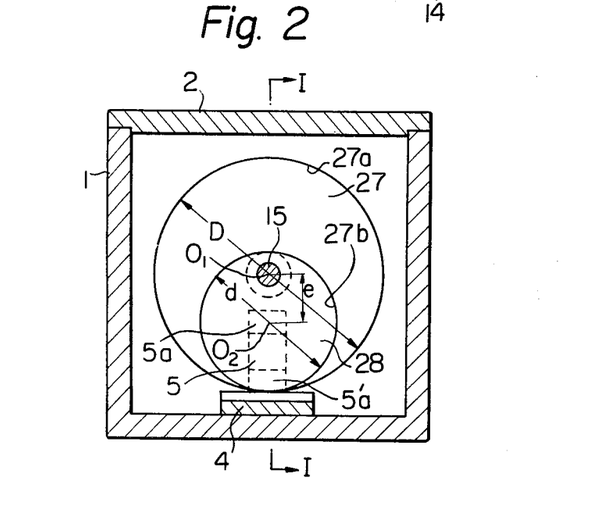
FIG. 2 is a cross-sectional view sectioned along the II—II line illustrated in FIG. 1.
Figure 6:
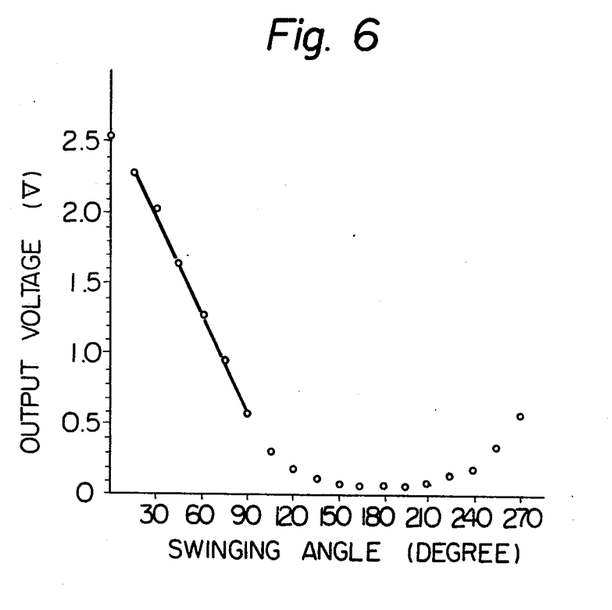
FIG. 6 is a diagram which illustrates the relationship between the swinging angle and the output voltage from the device according to the present invention.

Utilizing a device for detecting a running yarn tension according to the present invention, illustrated in FIGS. 1 and 2, the relationship between the swinging angle $\theta$ and the output thereof, which is a direct current voltage obtained by full-wave rectifying a voltage induced in the secondary windings 8 (FIG. 1), was observed. The data obtained from such observations are illustrated in FIG. 6. The swinging angle $\theta$ was measured in accordance with the definition described above with regard to the explanation of FIGS. 5(a) through 5(e). The data were obtained under the following conditions:

| | |
|---|---|
| Air gap G between primary core 5 and secondary core 6: | 2 mm |
| Area of ends 5a and 5a', or 6a and 6b' of core 5 or 6: | 299 mm² |
| Distance (Fig. 3) between ends 5a and 5a' or 6a and 6a' of cores 5 and 6: | 20 mm |
| Thickness of copper disc 18: | 1 mm |
| Diameter of copper disc 18: | 80 mm |
| Thickness of disc 27a of silicon steel: | 0.4 mm |
| Diameter D of the disc 27a of silicon steel: | 80 mm |
| Diameter d of opening 27b: | 50 mm |
| Number of primary windings 7: | 1500 |
| Power supply to primary windings 7: | AC 12 V (60 Hz) |
| Number of secondary windings 8: | 1500 |

From the diagram illustrated in FIG. 6, it was concluded that the device for detecting a running yarn tension utilized for the above-mentioned example has a gain of 23.2 mV/$\theta$ within a range of between 15° and 90° (and also within a range of between 270° and 345°) and a linear characteristic of ±2%.

According to those observations obtained under the same conditions as those mentioned above except for the air gap G, it was confirmed that a linear characteristic of the device can be obtained for an air gap G which is 2 to 5 mm wide and that a gain is slightly decreased as the air gap G is increased.

Since the device for detecting a running yarn tension according to the present invention has a very wide linear range in which the output signal thereof is proportional to the input yarn tension, the device can be utilized in various ways. In addition, since the device has a high gain, the device can be used without using an additional circuit for amplifying the output signal. The linear characteristic and the linear range of the device according to the present invention are adjusted by changing the diameters of the disc 27a and the opening 27b, the number of primary windings 7, the number of secondary windings 8, and the voltage of the alternating power supply. It can be understood that the device utilized for observing the example illustrated in FIG. 6 is preferable as a practical means for detecting a running yarn tension and that the device is simple in construction and can be easily manufactured. When the circular disc of a non-magnetic material, which is balanced around the center thereof, is utilized for supporting the crescent-shaped magnetic flux by-passing plate as illustrated in FIGS. 1 and 2, the thickness of the magnetic flux by-passing plate can be decreased. As a result, the unbalanced force acting on the rotatable shaft is decreased. Accordingly, the device can be stably operated even when it is utilized for detecting a low tension. In addition, since the direction of the attracting force of the core acting on the magnetic flux by-passing plate is perpendicular to the rotating direction of the magnetic flux by-passing member, the rotation of the magnetic flux by-passing member is not affected by the attraction force.

What we claim is:

1. A device for detecting a running yarn tension comprising:
    a primary core formed in a U-shape, which core has primary windings, capable of being connected to an alternating current power source, wound thereon for electromagnetically exciting said primary core;
    a secondary core formed in a U-shape, both ends of which face to those of said primary core for forming small air gaps therebetween so as to form a main magnetic circuit between said primary and secondary cores, said secondary core having secondary windings wound thereon for interlinking with said main magnetic circuit so as to induce a voltage therein;
    movable means which is movable in accordance with changes detected in the running yarn tension; and
    means associated with said movable means and moved within the outside of said small air gaps for by-passing magnetic flux from said main magnetic circuit so as to form an auxiliary magnetic circuit, wherein the width of said magnetic flux by-passing means, measured in a direction perpendicular to the moving direction of said magnetic flux by-passing means on a plane upon which said means is moved, is varied in accordance with the movement of said means due to changes in the running yarn tension,
whereby the magnetic reluctance of said auxiliary magnetic circuit is varied in accordance with the changes in the running yarn tension.

2. A device for detecting a running yarn tension comprising:
    a primary core, formed in a U-shape, having primary windings wound thereon for electromagnetically exciting said primary core;
    a first connector means, wired with said primary windings, for supplying an alternating current to said primary windings so as to electromagnetically excite said primary core;

a secondary core formed in a U-shape, both ends of which face to those of said primary core for forming small air gaps therebetween so as to form a main magnetic circuit between said primary and secondary cores, said secondary core having secondary windings wound thereon for interlinking with said main magnetic circuit so as to induce a voltage force therein:

a second connector means, wired with said secondary windings, for transmitting said voltage induced in said secondary windings;

movable means being movable in accordance with changes detected in the running yarn tension; and means associated with said movable means and moved within and outside of said small air gaps for by-passing magnetic flux from said main magnetic circuit so as to form an auxiliary magnetic circuit, wherein the width of said magnetic flux by-passing means, measured in a direction perpendicular to the moving direction of said magnetic flux by-passing means on a plane upon which said means is moved, is varied in accordance with the movement of said means due to the changes in the running yarn tension.

3. A device for detecting a running yarn tension according to claim 2, which further comprises an indicator means connected to said second connector means for indicating said induced voltage, whereby said running yarn tension to be detected is indicated by said indicating means.

4. A device for detecting a running yarn tension according to claim 3, wherein said indicator means includes a rectifier for rectifying an induced alternating current voltage into a direct voltage.

5. A device for detecting a running yarn tension comprising:

a primary core formed in a U-shape, which has primary windings, capable of being connected to an alternating current power source, wound thereon for electromagnetically exciting said primary core;

a secondary core formed in a U-shape, both ends of which face to those of said primary core for forming small air gaps therebetween so as to form a main magnetic circuit between said two cores and which has secondary windings wound thereon for interlinking with said main magnetic circuit so as to induce a voltage therein;

means having a rotating axis perpendicular to a plane on which said air gaps are located and being rotatable around said rotating axis in accordance with changes detected in the running yarn tension; and means connected to said rotatable means and located on said plane so as to rotate within and outside of said small air gaps, for by-passing magnetic flux from said main magnetic circuit so as to form an auxiliary magnetic circuit, wherein the width of said magnetic flux by-passing means, measured in a radial direction around said rotating axis, is varied in accordance with the rotation of said means due to the changes in the running yarn tension. measured in 6. A device for detecting a running yarn tension according to claim 5, wherein said rotatable means comprises a shaft which is swingably supported around said rotating axis, and a lever which is transversely connected to said shaft and having a yarn guide mounted on said lever for engaging said yarn to be detected.

7. A device for detecting a running yarn tension according to claim 5, wherein said rotatable means comprises a shaft which is swingably supported around said rotating axis; and a circular disc, made of a non-magnetic material, which is secured to said shaft so as to be located on said plane and which has said magnetic flux by-passing means mounted thereon.

8. A device for detecting a running yarn tension according to claim 5, wherein said magnetic flux by-passing means comprises a thin plate of ferromagnetic substance, the shape of which plate is formed by an arc of a circle having a large diameter and an arc of a circle having a small diameter.

9. A device for detecting a running yarn tension according to claim 5, wherein said rotatable means comprises a shaft which is swingably supported around said rotatable axis, a lever transversely connected to said shaft and having a yarn guide mounted thereon for engaging said yarn to be detected and a circular disc of non-magnetic material secured to said shaft so as to be located on said plane and having said magnetic flux by-passing means mounted thereon, and wherein said magnetic flux by-passing means comprises a thin plate of ferromagnetic substance, the shape of which plate is formed by an arc of a circle having a large diameter and an arc of a circle having a small diameter.

10. A device for detecting a running yarn tension according to claim 9, wherein said thin plate has a crescent shape formed from a circular disc having a large diameter and a removed circular opening having a small diameter which opening is removed from said disc, and wherein the peripheries of said disc and opening are in point contact with each other.

* * * * *

UNITED STATES PATENT OFFICE
CERTIFICATE OF CORRECTION

Patent No. 4,142,409  Dated March 6, 1979

Inventor(s) Kazuchika Miura

It is certified that error appears in the above-identified patent and that said Letters Patent are hereby corrected as shown below:

Column 1, lines 6 and 7: "a running yarn tension" should be --tension in a running yarn--.

line 7: "of" should be --in--.

line 11: "of" should be --in--.

line 13: after "detecting" insert --tension in--.

line 14: cancel "tension".

line 17: after "to" insert --variation in the tension of--.

line 17: cancel "tension variation".

line 19: after "detecting" insert --tension in--.

line 19: cancel "tension".

line 30: "is located to face to" should be --faces--.

line 30: "for forming" should be --with a--.

line 31: "gaps" should be --gap--.

line 31: "to form" should be --forms--.

UNITED STATES PATENT OFFICE
CERTIFICATE OF CORRECTION

Patent No. 4,142,409     Dated March 6, 1979

Inventor(s) Kazuchika Miura

It is certified that error appears in the above-identified patent and that said Letters Patent are hereby corrected as shown below:

Column 1, line 32: "between the two cores" should be --therewith--.

line 52: "read" should be --detected--.

line 64: after "detecting" insert --tension in--.

line 64: cancel "tension".

Column 2, line 60: after "detecting" insert --tension in--.

line 60: cancel "tension".

Column 5, line 27: after "detecting" insert --tension in--.

lines 27 & 28: cancel "tension".

line 53: after "detecting" insert --tension in--.

line 54: cancel "tension".

line 64: after "detecting" insert --tension in--.

line 64: cancel "tension".

Column 6, line 8: "can" should be --is to--.

line 28: after "detecting" insert --tension in--.

UNITED STATES PATENT OFFICE
CERTIFICATE OF CORRECTION

Patent No. 4,142,409            Dated  March 6, 1979

Inventor(s)  Kazuchika Miura

It is certified that error appears in the above-identified patent and that said Letters Patent are hereby corrected as shown below:

Column 6, line 28: cancel "tension".

line 36: cancel "to".

line 45: before "running" insert --tension of a--.

line 45: cancel "tension".

line 55: before "running" insert --tension of a--.

line 56: cancel "tension".

line 59: change "running yarn tension" to --tension of a running yarn--.

line 60: change "a running yarn tension" to --tension in a running yarn--.

Column 7, line 2: cancel "to".

line 13: "running yarn tension" should be --tension of a running yarn--.

line 23: "running yarn tension" should be --tension of a running yarn--.

line 24: "a running yarn tension" should be --tension in a running yarn--.

UNITED STATES PATENT OFFICE
CERTIFICATE OF CORRECTION

Patent No. 4,142,409        Dated March 6, 1979

Inventor(s) Kazuchika Miura

It is certified that error appears in the above-identified patent and that said Letters Patent are hereby corrected as shown below:

Column 7, line 27: after "said" (2nd occurrence) / insert --tension in a--.

line 28: "tension" should be cancelled.

line 30: after "detecting" insert --tension in--.

line 30: cancel "tension".

line 34: after "detecting" insert --tension in--.

line 34: cancel "tension".

line 41: "to" should be cancelled.

line 50: before "running" insert --tension of a--.

line 50: cancel "tension".

Column 8, line 6: "measuredin" should be --measured in--.

line 9: before "running" insert --tension of a--.

line 9: cancel "tension".

lines 9 and 10: cancel "measured in".

line 11: after "detecting" insert --tension in--.

UNITED STATES PATENT OFFICE
CERTIFICATE OF CORRECTION

Patent No. 4,142,409             Dated   March 6, 1979

Inventor(s)     Kazuchika Miura

It is certified that error appears in the above-identified patent and that said Letters Patent are hereby corrected as shown below:

Column 8, line 11:  cancel "tension".

line 17:  after "detecting" insert --tension in--.

line 17:  cancel "tension".

line 24:  after "detecting" insert --tension in--.

line 24:  cancel "tension".

line 30:  after "detecting" insert --tension in--.

line 30:  cancel "tension".

line 43:  after "detecting" insert --tension in--.

line 43:  cancel "tension".

Signed and Sealed this

Tenth Day of July 1979

[SEAL]

Attest:

LUTRELLE F. PARKER
Attesting Officer     Acting Commissioner of Patents and Trademarks